No. 677,957. Patented July 9, 1901.
A. G. DAVIS.
ELECTRIC METER.
(Application filed May 17, 1901.)
(No Model.)
Fig. 1.
Fig. 2.
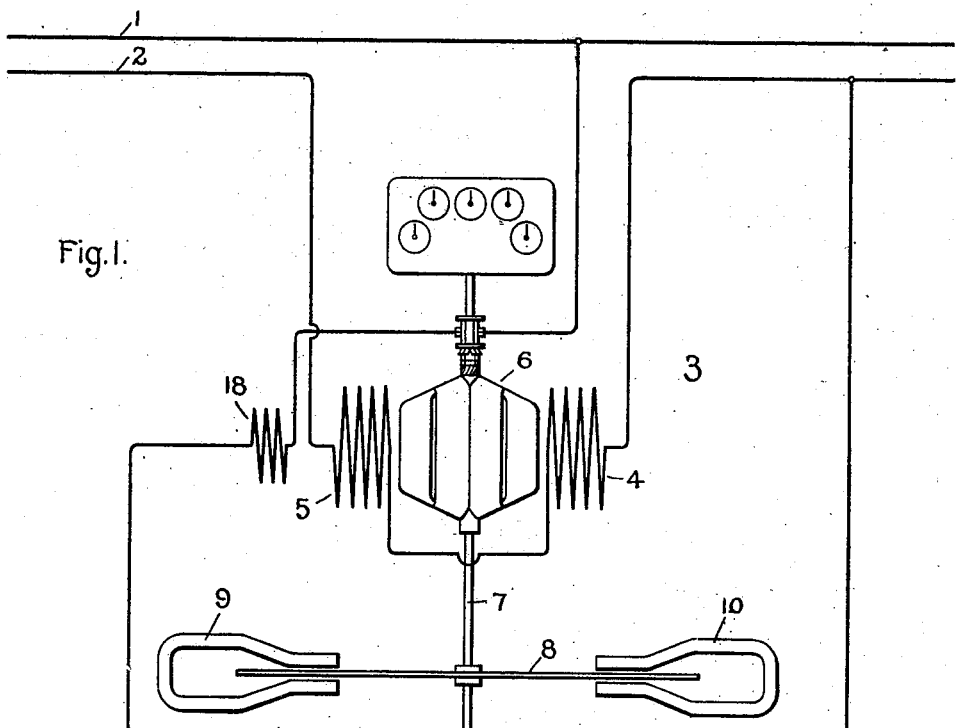
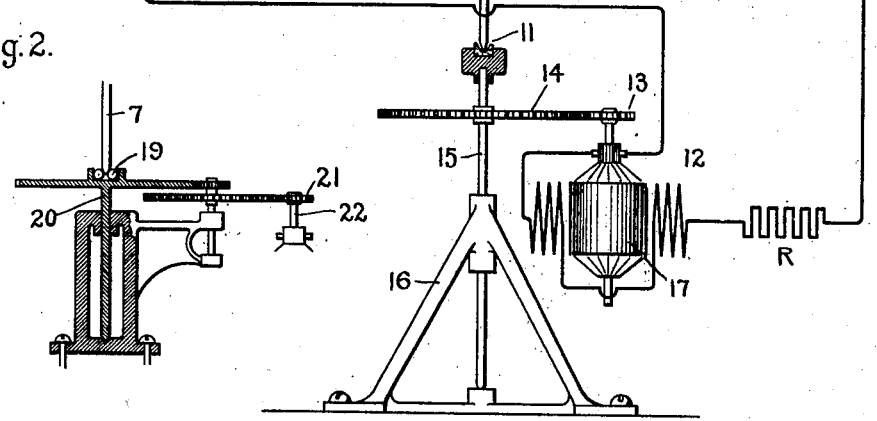
Witnesses
John Ellis Glenn
Benjamin B. Hull
Inventor:
Albert G. Davis
THE NORRIS PETERS CO., PHOTO-LITHO., WASHINGTON, D. C.

UNITED STATES PATENT OFFICE.

ALBERT G. DAVIS, OF SCHENECTADY, NEW YORK, ASSIGNOR TO GENERAL ELECTRIC COMPANY, OF NEW YORK.

ELECTRIC METER.

SPECIFICATION forming part of Letters Patent No. 677,957, dated July 9, 1901.

Application filed May 17, 1901. Serial No. 60,658. (No model.)

*To all whom it may concern:*

Be it known that I, ALBERT G. DAVIS, a citizen of the United States, residing at Schenectady, county of Schenectady, State of New York, have invented certain new and useful Improvements in Electric Meters, (Case No. 1,878,) of which the following is a specification.

My present invention relates to means for reducing friction in electric meters and other devices having relatively movable parts. In meters the friction which tends to restrain the rotation of the movable member is always objectionable, and particularly so when the meter runs on light loads for any considerable portion of its period of operation. A considerable portion of the friction is due to the jewel or other bearing for the lower end of the meter-shaft, and it is this friction which I cause to be eliminated by positively rotating the jewel or other bearing at a speed approximating the mean speed of the meter-armature.

The scope of my invention I will point out particularly in the claims appended hereto, while the details of the invention and its mode of application will be made clear by reference to the following description, taken in connection with the accompanying drawings, in which—

Figure 1 represents my invention in diagram, and Fig. 2 shows a modified detail of the same.

In Fig. 1 the mains 1 and 2 represent a circuit to which a meter 3 is connected in a well-understood manner. This meter consists of the field-coils 4 5, in series with the main 2, and the armature 6, connected in a circuit across said mains 1 2. The armature-shaft 7 carries the usual retarding-disk 8, which cooperates in the ordinary manner with retarding or damping magnets 9 10. The lower end of the shaft 7 is carried by a jewel or other bearing 11. This bearing instead of being stationary, as has been the usual practice heretofore, is in accordance with my invention caused to rotate in the same direction as the shaft 7, thereby doing away almost, if not entirely, with relative motion between the said bearing and the lower end of the shaft 7, and thereby with the friction occasioned by such relative motion. The means for securing motion of the supporting-bearing may assume a large variety of forms, as will be evident to one skilled in the art. In the drawings, however, I have shown a satisfactory mechanism for accomplishing this result, the mechanism in this instance consisting of a small series motor 12, geared, by means of a pinion 13, to a larger gear-wheel 14, fixed to a shaft 15, which at its upper end carries the bearing 11 and is itself supported by a suitable step or framework 16. The motor 12 is connected in series with the armature-circuit of the meter 3, this circuit including, if desired, the usual resistance R. Since the series motor 12 might under certain circumstances tend toward an indefinite speed of rotation, and thereby by reason of its counter electromotive force act to cut down or choke off the current flowing in the circuit of the meter-armature 6, I provide the said motor with a suitable load, which in this case may consist of a cylinder 17, of copper or other good material, surrounding and carried by the armature of the motor 12. If desired, the armature-winding instead of being located inside may of course be placed outside of the metal sleeve or damping device. It will be evident that as the motor-armature rotates currents will be induced in this metal sleeve which act to retard the motion of the armature, thereby constituting a mechanical load. I may, if desired, provide the meter 3 with an additional field-coil 18, placed in the armature-circuit, as shown. This field-coil may be connected either so as to assist the forward rotation of the meter-armature or to oppose the same, as may be necessary to secure a proper adjustment of the friction-compensating means described.

Instead of making use of a jewel-bearing such as shown at 11 I may when desired employ instead a ball or roller bearing, such as shown in Fig. 2. In this figure the lower end of the shaft 7 will be seen to be supported by a series of balls 19, placed in the recessed upper end of the pivotally-mounted carrier 20. This carrier is geared, as shown, to the pinion 21 of a motor-shaft. Inasmuch as one revolution of the shaft 7 causes the balls 19 to traverse but a comparatively small portion of a single circle of their movement, it will be evident that the shaft 20 requires a considerably slower movement than the shaft 7 in order to produce no relative movement between the shaft 7 and the balls 19, which immediately support the same. The motor-shaft 22 is for this reason shown as connected through a speed-reducing gearing necessary for securing the low speed required, this speed being, as will be evident, considerably less than that necessary in connection with the arrangement shown in Fig. 1.

What I claim as new, and desire to secure by Letters Patent of the United States, is—

1. The combination of a shaft, a step-bearing for supporting said shaft, and means for rotating said bearing.

2. The combination of a shaft, a supporting-bearing for said shaft, and means for rotating said bearing.

3. The combination of a shaft, a bearing for supporting said shaft, and electrically-operated means for rotating said bearing.

4. The combination of a shaft, a bearing for supporting the shaft, and an electric motor for rotating said bearing.

5. The combination with a rotating member of an electric meter, of a bearing for carrying said member, and means controlled by current passing through the meter for rotating said bearing.

In witness whereof I have hereunto set my hand this 15th day of May, 1901.

ALBERT G. DAVIS.

Witnesses:
BENJAMIN B. HULL,
MARGARET E. WOOLLEY.